O. LUND.
ANIMAL TRAP.
APPLICATION FILED JULY 23, 1908.
929,147.
Patented July 27, 1909.
2 SHEETS—SHEET 2.
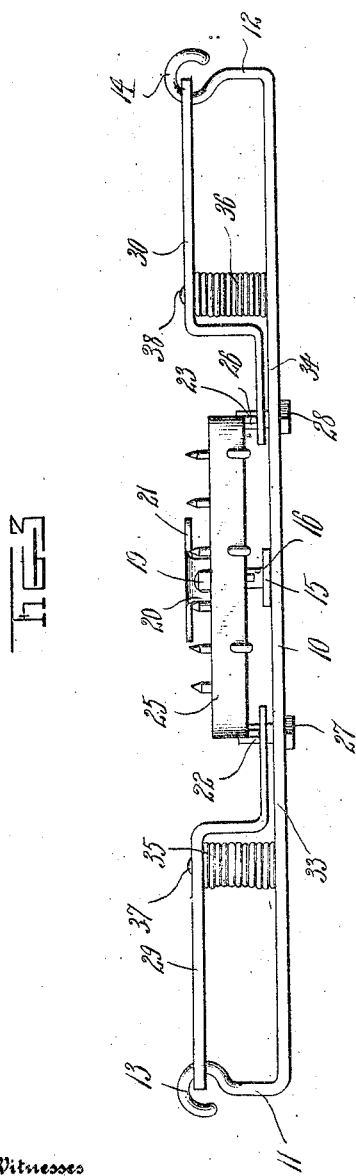
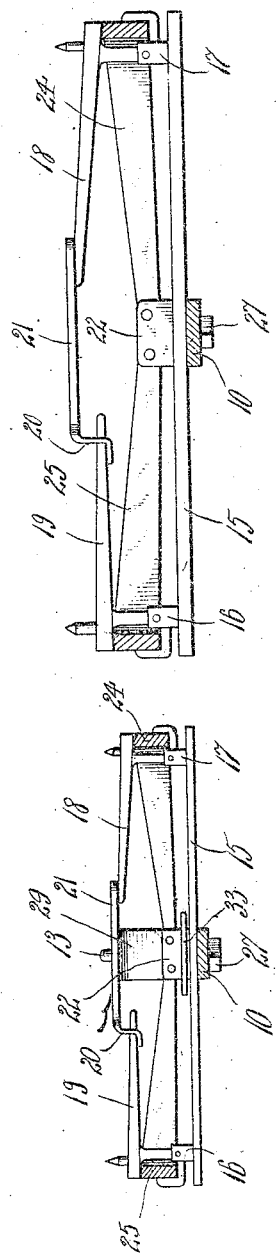
Witnesses
J.H. Crawford.
M. J. Miller
Inventor
Olaf Lund,
By
Attorneys

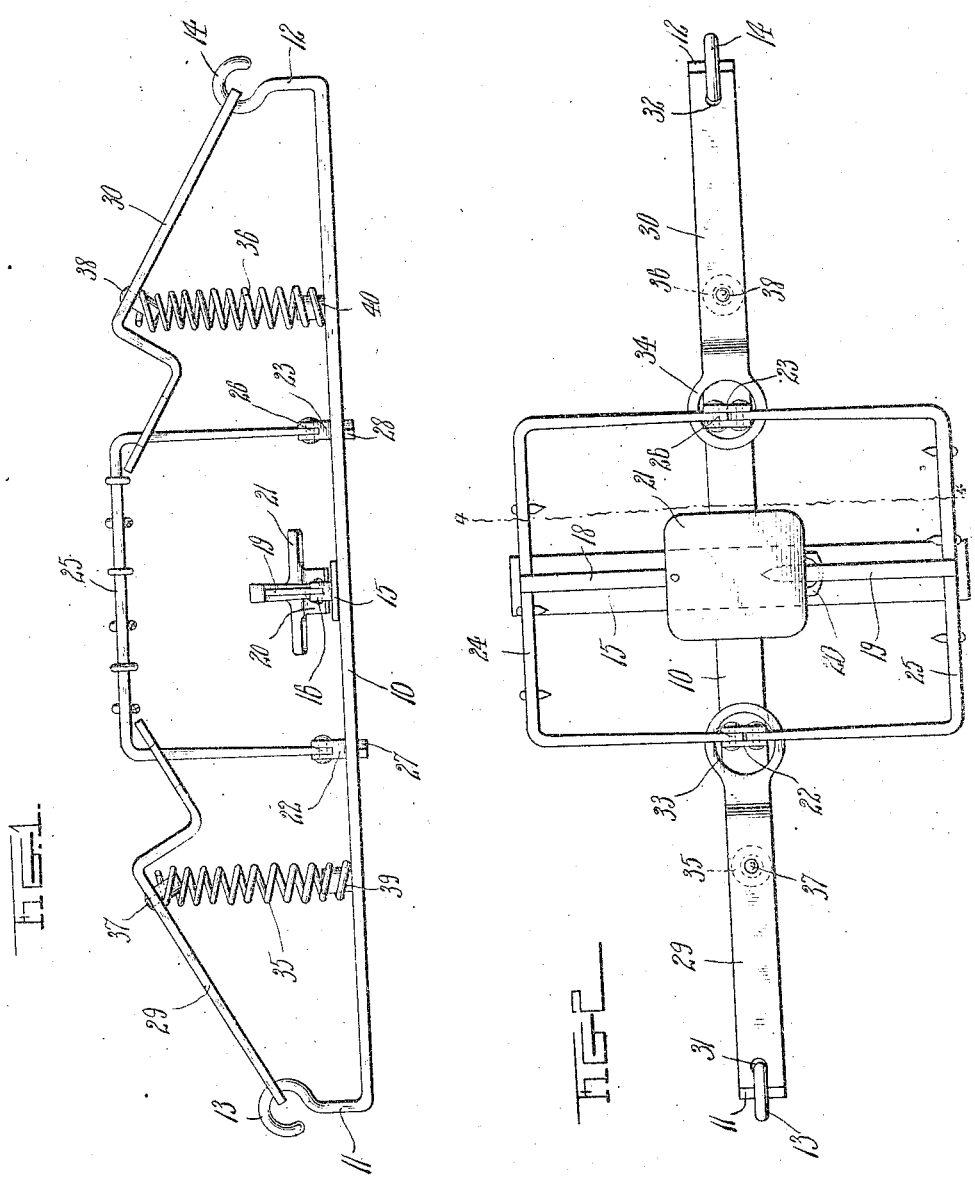

UNITED STATES PATENT OFFICE.

OLAF LUND, OF ESMOND, NORTH DAKOTA.

ANIMAL-TRAP.

No. 929,147.  Specification of Letters Patent.  Patented July 27, 1909.

Application filed July 23, 1908. Serial No. 444,963.

*To all whom it may concern:*

Be it known that I, OLAF LUND, a citizen of the United States, residing at Esmond, in the county of Benson, State of North Dakota, have invented certain new and useful Improvements in Animal-Traps; and I do hereby declare the following to be a full, clear, and exact description of the invention, such as will enable others skilled in the art to which it appertains to make and use the same.

This invention relates to animal traps, and has for one of its objects to simplify and improve the construction and increase the efficiency and utility of devices of this character.

Another object of the invention is to provide a simply constructed trap the parts of which may be readily separated and packed in a small space for transportation and storage.

With these and other objects in view the invention consists in a base having upturned ends terminating in hooks, a transverse member carrying trigger devices, trap jaws swinging from the base and adapted to be engaged by said triggers, rods having eyes at the ends and respectively engaging said hooks and jaw members, springs between said rods and base, and a bait pan operating to hold the triggers detachably engaging the jaws.

The invention further consists in certain novel features of construction as hereafter shown and described and then specifically pointed out in the claims, and in the drawings illustrating the preferred embodiment of the invention, Figure 1 is a side elevation with the jaws in closed position. Fig. 2 is a plan view with the jaws in open or set position. Fig. 3 is a side elevation of the improved device with the jaws in open or set position. Fig. 4 is a section on the line 4—4 of Fig. 2. Fig. 5 is an enlarged detail illustrating the construction of the trigger operating mechanism.

The improved device comprises a base formed from an elongated bar 10 having upturned ends 11—12 terminating in hooks 13—14.

Connected to the base 10 intermediate its ends is a transverse plate 15 having ears 16 and 17 respectively at its ends, to which are pivoted the lower ends of angular triggers 18 and 19. The triggers 18 and 19 extend toward each other and the trigger 18 has fixed thereto a tread plate 21 which at its diametrically opposite edge from said trigger, is provided with a depending loop 20 through which is slidably engaged the opposite trigger 19.

Connected to the base 10 are spaced supports 22 and 23 to which are pivoted the lower ends of inverted U shaped jaw members 24 and 25, the said supports including stems engaged through the base and provided with nuts 27 and 28 at their lower ends to hold them removably in place.

Two lifting bars 29 and 30 are provided and are engaged at their outer ends with the hooks 13—14 formed at the extremities of the base plate 10, said hooks being engaged through eyes 31—32 respectively formed in said lifting bars. At their inner ends, the lifting bars are provided with loops 33 and 34 respectively which embrace the supports 22 and 23 when the loops are in retracted positions and are designed to move vertically along the legs of the inverted U shaped jaws to swing the latter from their set position, illustrated in Fig. 2, to their closed position, illustrated in Fig. 1. To effect this upward movement of the looped ends of the bars, springs 35 and 36 are provided and are disposed with their lower ends over the posts 39 and 40 mounted upon the base 10, while the upper ends of the springs embrace the studs 37 and 38 which are engaged through and depend from the bars 29 and 30 respectively. When the jaws are to be swung with their gripping portions apart or into set position, the bars or members 29 and 30 are depressed to the position shown in Fig. 3, at which time the springs are placed under tension, the jaws themselves being engaged beneath the outer end portions of the trigger members 18 and 19, as illustrated.

While the tendency of the springs is to move the lifting bars upwardly and spring the jaws together, the proportions and arrangement of the trigger members are such as to prevent this movement. But as soon as the tread plate is depressed to a slight degree, the outer end portions of the trigger members are swung from the jaws assisted by the upward movement of the jaws, so that the jaws finally pass entirely from the trigger members and are rapidly closed under the influence of the springs and the lifting bars.

When it is desired to transport the trap for any reason, the nuts 26 and 27 are detached and the jaws 24 and 25 with the supports 22 and 23 are removed from the loops 33 and 34 and the bars 29 and 30 are disengaged from the hooks 13 and 14 respectively when the various parts may be closely packed.

The device is simple in construction, can be inexpensively manufactured and of any required size to fit the device for trapping different sizes of animals.

The improved trap is readily adaptable to catching animals of different species and sizes, and may be varied in its dimensions for this purpose.

What is claimed, is:—

1. A trap comprising a base having spaced apertures and with the ends upturned and terminating in open hooks, supports spaced apart and provided with threaded studs extending through the base apertures, binding nuts engaging said threaded studs, jaws swinging at their ends upon said supports, bars having eyes at their outer ends detachably engaging the hooks of said base and with eyes at their inner ends engaging over said supports and likewise over the swinging jaws, springs between said base and said bars, a tread plate, and trigger devices between said tread plate and jaws and operating to hold the same in "set" position.

2. A trap comprising a base having spaced apertures and upturned ends terminating in open hooks, a transverse member carried by said base, supports spaced apart and provided with threaded studs extending through the base apertures, binding nuts engaging said threaded studs, jaws mounted to swing at their ends upon said supports, bars having eyes at their ends detachably engaging the hooks of said base and said jaws, a tread plate having a depending loop at one side and an arm extending from the other side and adapted to project over one jaw and mounted to swing near its outer end from said transverse member at one side, a trigger member mounted to swing from said transverse member at the other side and adapted to project at one end over the other jaw and at the other end through said tread plate loop, and springs arranged to actuate said bars.

3. A trap comprising a base having upturned ends terminating in open hooks, a transverse member connected to said base intermediate the ends, jaws mounted to swing at their ends upon said base, bars having eyes at their ends adapted to adjustably engage the hooks of said base and said jaws, a tread plate having an arm adapted to extend from one side and adapted to project over one of said jaws and provided with a depending lug mounted to swing upon said transverse member, said tread plate having a depending loop at its free side, a trigger member adapted to project by its outer end over the other jaw and adapted to extend at its inner end through said tread plate loop and with a depending lug connected to swing from said transverse member, and springs arranged to actuate said bars.

In testimony whereof, I affix my signature, in presence of two witnesses.

OLAF LUND.

Witnesses:
PAUL CRUM,
A. B. ATKINS.